US008325801B2

(12) United States Patent
Lei et al.

(10) Patent No.: US 8,325,801 B2
(45) Date of Patent: Dec. 4, 2012

(54) ADAPTIVE RESTORATION FOR VIDEO CODING

(75) Inventors: Shaw-Min Lei, Taipei County (TW); Yu-Wen Huang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 962 days.

(21) Appl. No.: 12/192,147

(22) Filed: Aug. 15, 2008

(65) Prior Publication Data

US 2010/0040141 A1  Feb. 18, 2010

(51) Int. Cl.
*H04N 7/12* (2006.01)
(52) U.S. Cl. ............... 375/240.03; 375/240; 375/240.17; 375/240.24; 375/240.25; 375/240.28
(58) Field of Classification Search ............... 375/240, 375/240.03, 240.17, 240.24, 240.25, 240.26, 375/240.27, 240.28; 348/445, 565, 584
See application file for complete search history.

(56) References Cited

U.S. PATENT DOCUMENTS

| | | | |
|---|---|---|---|
| 4,922,341 A | 5/1990 | Strobach | |
| 5,550,935 A | 8/1996 | Erdem | |
| 5,751,358 A * | 5/1998 | Suzuki et al. | 375/240.04 |
| 6,125,147 A | 9/2000 | Florencio | |
| 6,404,361 B2 * | 6/2002 | Andrews et al. | 341/94 |
| 6,909,745 B1 * | 6/2005 | Puri et al. | 375/240.01 |
| 7,068,722 B2 * | 6/2006 | Wells | 375/240.16 |
| 7,116,830 B2 * | 10/2006 | Srinivasan | 382/236 |
| 7,142,598 B2 * | 11/2006 | Kim et al. | 375/240 |
| 8,009,740 B2 * | 8/2011 | Gordon | 375/240.25 |
| 2005/0244063 A1 * | 11/2005 | Kwon et al. | 382/233 |
| 2005/0281334 A1 | 12/2005 | Walker | |
| 2006/0067406 A1 * | 3/2006 | Kitada et al. | 375/240.16 |
| 2006/0209961 A1 * | 9/2006 | Han et al. | 375/240.16 |
| 2006/0251330 A1 | 11/2006 | Toth | |
| 2007/0025631 A1 * | 2/2007 | Kim et al. | 382/248 |
| 2007/0091997 A1 | 4/2007 | Fogg | |
| 2008/0123977 A1 | 5/2008 | Moriya | |
| 2008/0165848 A1 * | 7/2008 | Ye et al. | 375/240.13 |
| 2008/0304562 A1 * | 12/2008 | Chang et al. | 375/240.03 |
| 2009/0034856 A1 * | 2/2009 | Moriya et al. | 382/238 |
| 2009/0046944 A1 * | 2/2009 | Bilcu et al. | 382/274 |
| 2009/0168890 A1 * | 7/2009 | Holcomb | 375/240.16 |
| 2010/0002100 A1 * | 1/2010 | Master et al. | 348/231.99 |
| 2010/0135387 A1 | 6/2010 | Divorra Escoda | |

FOREIGN PATENT DOCUMENTS

| | | |
|---|---|---|
| CN | 1981535 | 6/2007 |
| EP | 1841230 | 3/2006 |
| KR | 20030076869 | 9/2003 |
| KR | 1020050031653 | 4/2005 |
| WO | 2006005798 A1 | 1/2006 |

OTHER PUBLICATIONS

ICIP2007 "Transmission of post-filter hints for video coding schemes", Steffen Wittmann and Thomas Wedi, in Proceedings of 2007 IEEE International Conference on Image Processing.

\* cited by examiner

*Primary Examiner* — Ayaz Sheikh
*Assistant Examiner* — Andrew C Lee
(74) *Attorney, Agent, or Firm* — Winston Hsu; Scott Margo

(57) ABSTRACT

A coding system includes an inter prediction block, a transform and quantization block, an encoding unit, and a reconstruction loop with an adaptive restoration block. The inter prediction block performs prediction on a current frame, the transform and quantization block performs transform and quantization processes on prediction residues, and the reconstruction loop reconstructs the current frame to generate the restored reconstructed samples. The adaptive restoration block performs restoration on processed data by considering a plurality of candidate restoration methods, selects one of the candidate restoration methods as a final restoration method, and generates adaptive restoration information corresponding to the final restoration method. The encoding unit encodes the prediction information and adaptive restoration information to generate an encoded bitstream.

43 Claims, 10 Drawing Sheets

ADAPTIVE RESTORATION FOR VIDEO CODING

BACKGROUND

The present invention relates to encoding and decoding of video data, and more particularly, relates to video encoding and decoding with adaptive restoration for fidelity enhancement.

Popular video coding standards, such as ITU-T standards denoted as H.26x and ISO/IEC standards denoted as MPEG-x, are developed to compress video data for transmission over a channel with limited frequency bandwidth or storage in a memory with limited capacity. These video coding methods include various coding stages such as intra prediction, transform from spatial domain to frequency domain, quantization, entropy coding, motion estimation and motion compensation, in order to code successive frames. These coding techniques can often result in quantization errors, for example, the quantization errors at block boundaries become visible as 'edging' on blocks of video frames.

In order to compensate for these blocking effects, conventional coders employ various methods such as deblocking filters to smooth pixels at the boundaries of each block. Deblocking filters can only work on pixels at the boundaries of blocks, however, and cannot compensate for errors within the blocks. Recent developments, therefore, have seen the utilization of Wiener filters, which work to improve picture quality by minimizing the mean square error between an original signal and a noisy signal (i.e. a signal having quantization errors).

In some cases, Wiener filtering is not the most appropriate method for reducing quantization errors. If Wiener filtering is the only option for reducing quantization errors, the received pictures will not always be of a guaranteed quality.

SUMMARY

It is therefore an aim of the present invention to provide means of adaptive filtering that can provide a best method of fidelity enhancement, regardless of the original quantization errors.

The proposed methods cover both spatial adaptation and temporal adaptation methods.

In addition, a device for adaptive fidelity enhancement is disclosed. The adaptive fidelity enhancement device can be implemented on both the encoder and decoder sides. The adaptive fidelity enhancement device can be implemented in various locations.

A coding system according to an exemplary embodiment comprises: an inter prediction block, for performing prediction on macroblocks of a current frame and generating prediction information according to restored reconstructed samples of a reference frame; a transform and quantization block, coupled to the prediction block, for performing transform and quantization processes on prediction residues; a reconstruction loop, coupled between the transform and quantization block and the inter prediction block, for reconstructing the current frame to generate the restored reconstructed samples. The reconstruction loop comprises at least one adaptive restoration block, for performing restoration according to information derived from the current frame by considering a plurality of restoration methods, selecting one or more candidate restoration method according to a cost function result or an analysis result, and generating adaptive restoration information corresponding to a final restoration method; and an entropy coding unit, coupled to the transform and quantization block and adaptive restoration block, for encoding the prediction information and adaptive restoration information to generate an encoded bitstream.

A method according to an exemplary embodiment comprises: receiving a current frame; performing a plurality of restoration methods on processed data of the current frame or a reference frame according to a plurality of candidate restoration methods, respectively; comparing cost functions for the candidate restoration methods to select a restoration method; and encoding the current frame according to a final restoration method.

A coding system according to an exemplary embodiment comprises a decoding block, for receiving and decoding an encoded bitstream to derive residues, prediction information, and adaptive restoration information; and a reconstruction loop, for reconstructing a current frame according to the residues and prediction information. The reconstruction loop comprises an adaptive restoration block capable of performing multiple restoration methods, and the adaptive restoration block performs restoration on processed data by selecting one of the restoration methods according to the adaptive restoration information.

These and other objectives of the present invention will no doubt become obvious to those of ordinary skill in the art after reading the following detailed description of the preferred embodiment that is illustrated in the various figures and drawings.

DETAILED DESCRIPTION

The following description discloses adaptive restoration methods and apparatus, for selecting an optimal restoration method according to cost function and/or analysis results. This is achieved through the utilization of an adaptive restoration (AR) block in the encoder and decoder for encoding and decoding video data utilizing a plurality of restoration methods. An optimal restoration method will be selected, AR parameters associated with said restoration method are encoded and embedded into the encoded bitstream, and then the decoder decodes these embedded parameters in order to perform restoration at the decoder side. In this way, not only is uniformity of coding preserved, but in-block quantization errors are reduced.

The encoder can select a restoration method in a plurality of ways. Where compression performance, rather than time, is an issue, a brute force search can be performed. This search tries all candidate restoration methods available in the adaptive restoration block and determines which restoration method gives the best cost function result. The aim is to minimize the rate-distortion cost function ($J=D+\lambda R$).

A more sophisticated method of selecting a restoration method involves first analyzing a current frame in order to determine which restoration methods would be likely to have the greatest effect on the cost function, and which restoration methods do not need to be tested. Once the analysis is complete, the encoder will select only one or some restoration methods from the plurality of available restoration methods in the adaptive restoration block as candidate restoration methods, and test each one in turn to see which has the most effect on minimizing the rate and distortion cost function.

The purpose of applying restoration methods to the video encoders and decoders is to enhance fidelity by canceling errors; examples of the restoration method include, but are not limited to, Kalman filtering, noise reduction, deblurring, Wiener filtering, regression and regularization. It should be noted that, as the aim of the adaptive restoration technique is to choose between candidate restoration methods according to cost function and/or analysis results, all possible restoration methods fall within the scope of the present invention.

Figure 1:
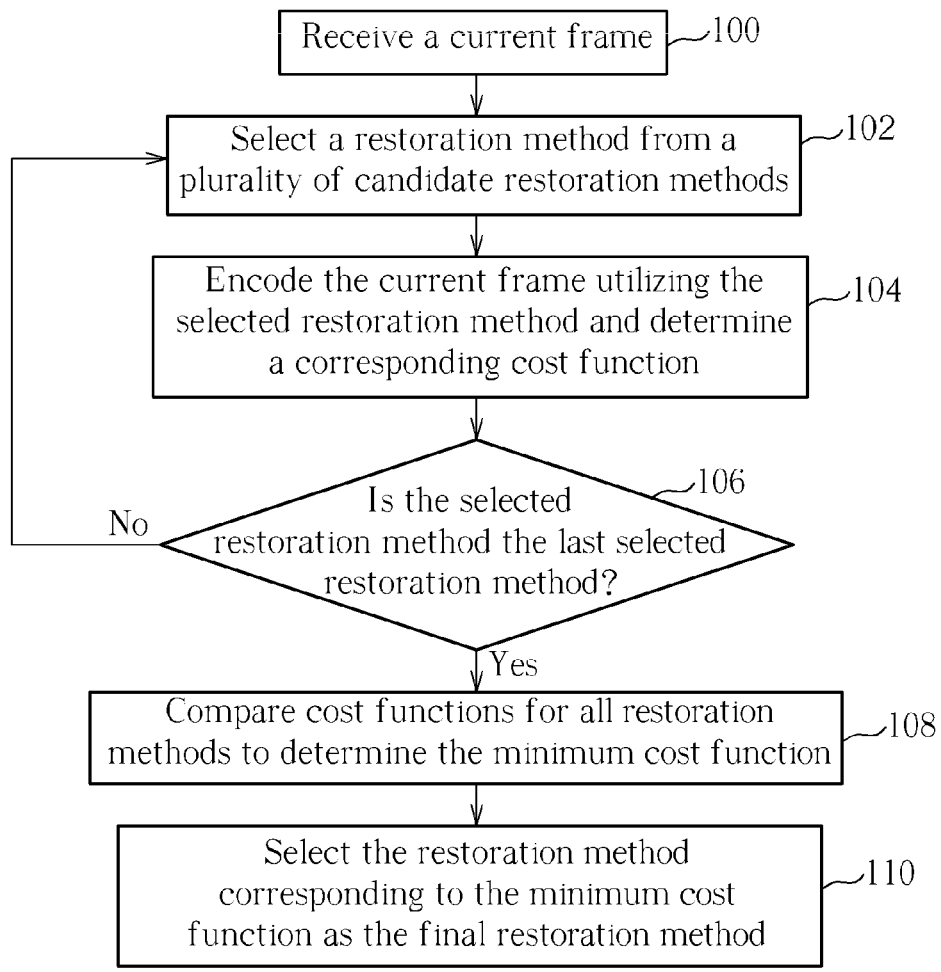
FIG. 1 is a flowchart illustrating a first encoding method of the present invention.
Figure 2:
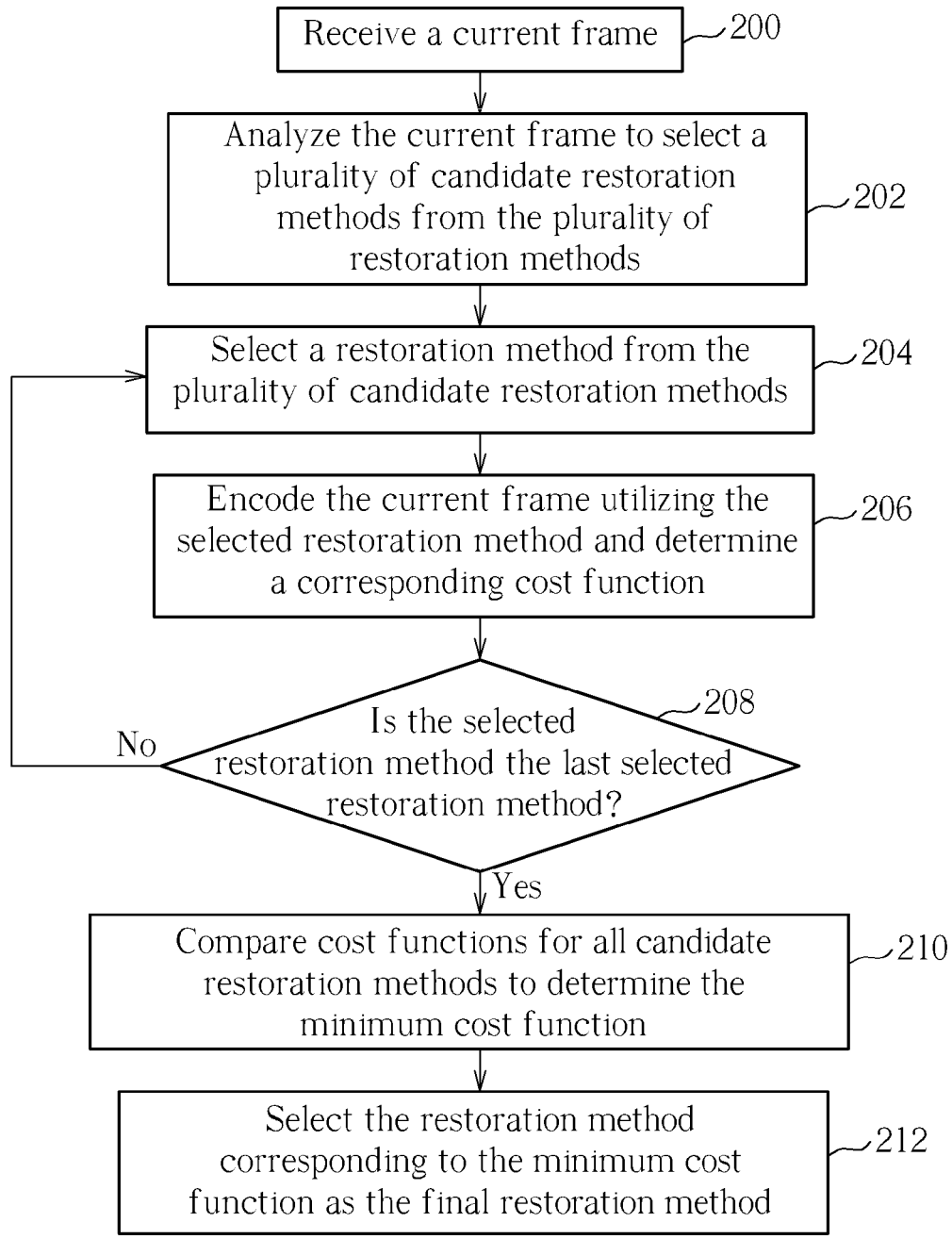
FIG. 2 is a flowchart illustrating a second encoding method of the present invention.

For more detailed illustration of these methods, please refer to FIGS. 1 and 2. FIGS. 1 and 2 are, respectively, flowcharts illustrating a first and a second encoding method with adaptive restoration. The steps of FIG. 1 are as follows:

Step 100: Receive a current frame;
Step 102: Select a restoration method from a plurality of candidate restoration methods;
Step 104: Encode the current frame utilizing the selected restoration method and determine a corresponding cost function;
Step 106: Is the selected restoration method the last selected restoration method? If yes go to Step 108; if not go back to Step 102;
Step 108: Compare cost functions for all restoration methods to determine the minimum cost function;
Step 110: Select the restoration method corresponding to the minimum cost function as a final restoration method for encoding the current frame.

The steps of FIG. 2 are:
Step 200: Receive a current frame;
Step 202: Analyze the current frame to select a plurality of candidate restoration methods from the plurality of restoration methods;
Step 204: Select a restoration method from the plurality of candidate restoration methods;
Step 206: Encode the current frame utilizing the selected restoration method and determine a corresponding cost function;
Step 208: Is the selected restoration method the last selected restoration method? If yes go to Step 210; if no go back to Step 204;
Step 210: Compare cost functions for all candidate restoration methods to determine the minimum cost function;
Step 212: Select the restoration method corresponding to the minimum cost function as a final restoration method for encoding the current frame.

In the method illustrated in FIG. 1 the candidate restoration methods are all restoration methods available in the adaptive restoration block. In the method illustrated in FIG. 2, the candidate methods are first selected in Step 202, through analysis results. The method then proceeds as in FIG. 1. In some embodiments, step 202 of FIG. 2 only selects one candidate restoration method after analyzing the current frame, and thus the encoder utilizes this candidate restoration method for encoding without computing and comparing the cost function. In steps 104 and 206, the cost function of each candidate restoration method is determined. The steps of selecting and testing a candidate restoration method are repeated until all candidate restoration methods have been tested. The cost function for each respective restoration method is then compared, and the cost function having the minimum value is thereby determined to select the corresponding candidate method as the final restoration method that will be utilized by the encoder and decoder.

In some embodiments, step 202 analyzes information used during encoding, where the information can be derived from reference frames, motion vectors, textures, transform results, quantization results, prediction errors, reconstructed errors, or a combination thereof.

The parameters associated with the final restoration method are also encoded as adaptive restoration (AR) information, and this coded AR information is sent with the encoded bitstream to the decoder. Please note that, in some embodiments the encoded AR information can be placed in the header of the bitstream, in other embodiments the encoded AR information can be placed in the tail of the bitstream or any other point in the bitstream, and all modifications fall within the scope of the present invention. When the AR information is received by the decoder, it is utilized to perform adaptive restoration according to the final restoration method.

It should be clear from the above description that both methods fall within the scope of the claimed invention, and the selection between brute force search and analysis selection of candidate restoration methods is according to a user's preference, and time vs. compression performance considerations.

The encoding methods illustrated in FIGS. 1 and 2 are frame adaptation of multiple restoration methods, that is, the restoration method selection process is repeated when receiving a new frame. It should be noted that encoding methods with macroblock adaptation, slice adaptation, quad-tree partition adaptation, picture adaptation, or group of picture adaptation of multiple restoration methods also fall within the scope of the claimed invention. For example, in an embodiment of an encoding method, a new restoration method is selected out of a plurality of restoration methods when receiving N slices of video data.

Figure 3:
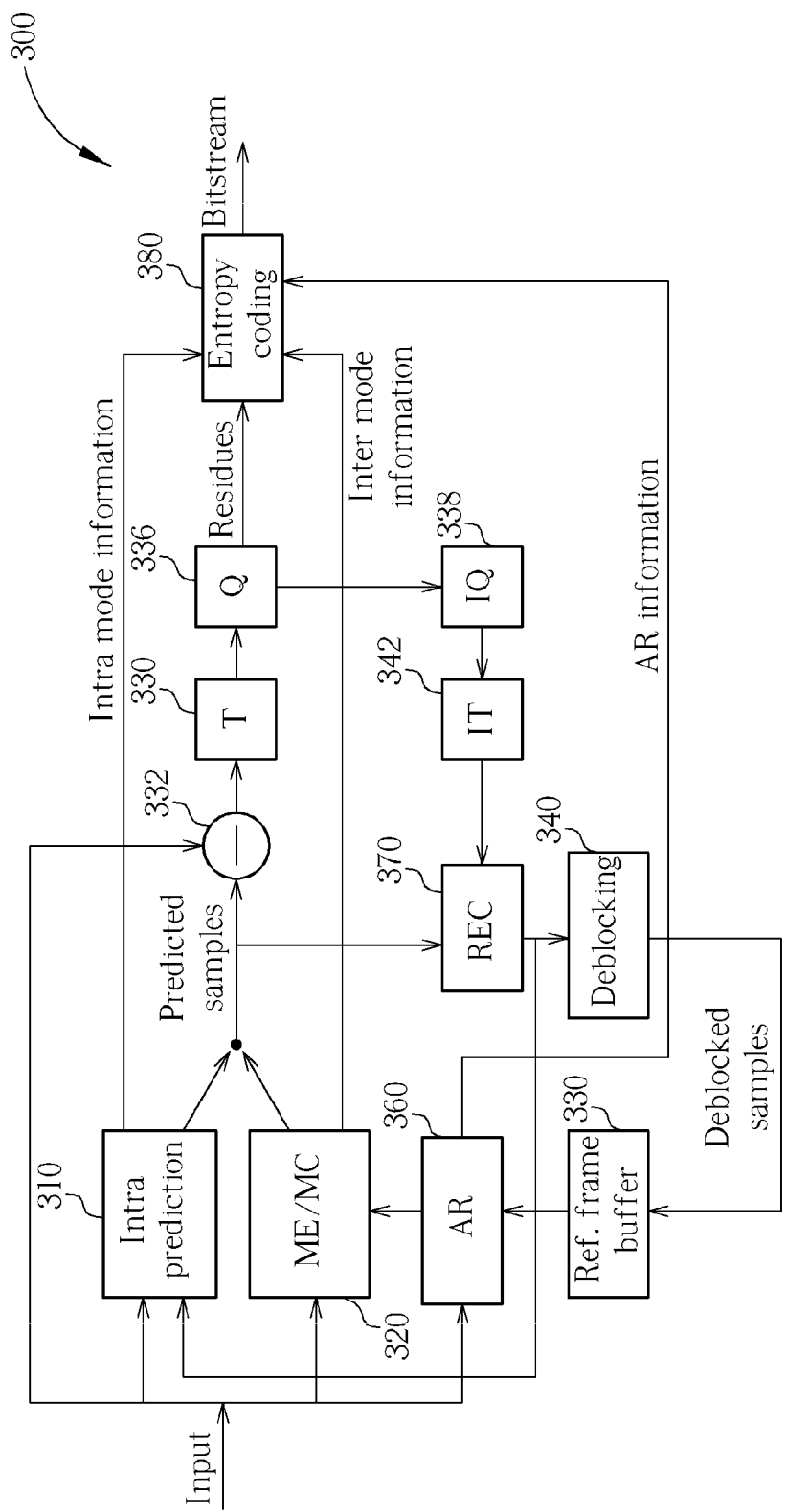
FIG. 3 is a diagram of an encoder according to a first embodiment of the present invention.

Please refer to FIG. 3. FIG. 3 is a diagram illustrating a first embodiment of an encoder 300 showing a first location of the adaptive restoration (AR) block 360. As seen in the diagram, the AR block 360 is located between the reference frame buffer 330 and the motion estimation/motion compensation (ME/MC) block 320. In this way, deblocked samples from the deblocking filter 340 are input to the AR block 360 through reference frame buffer 330, which can then perform restoration on one or a plurality of reference frames. The AR information is encoded and embedded in the bitstream by the entropy coding block 380. The AR block 360 in this embodiment tries to restore the reference frame stored in the reference frame buffer 330 in order to minimize a difference of matched blocks between the current frame and reference frame. It is assumed that those skilled in the pertinent art are familiar with the general operation of encoders and decoders. Therefore, for the purposes of illustrating the present invention, detailed operations of conventional functional blocks will not be described in the following.

Figure 4:
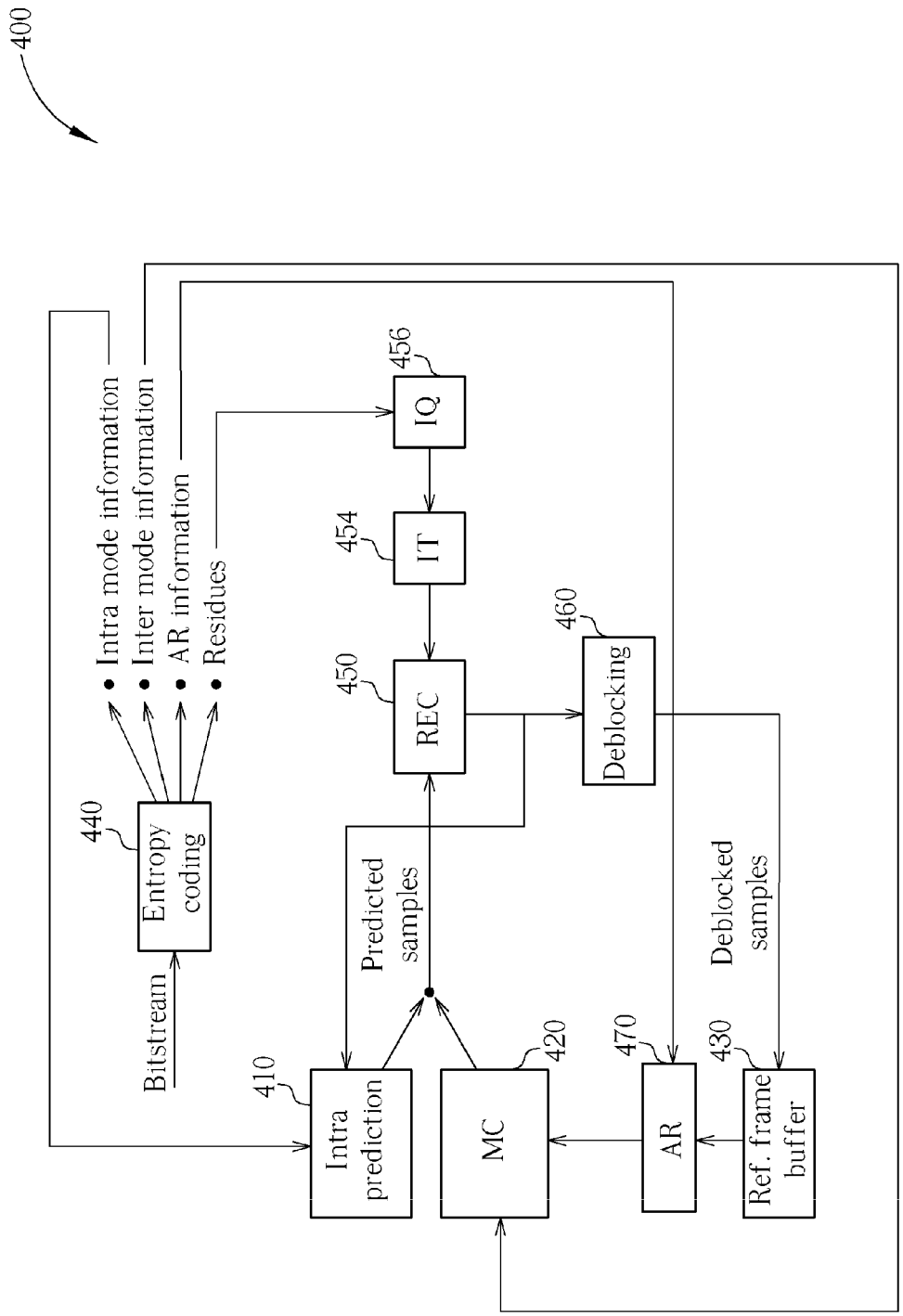
FIG. 4 is a diagram of a decoder according to the first embodiment of the present invention.

Please refer to FIG. 4. FIG. 4 is a diagram of a decoder 400 according to the first embodiment. The decoder 400 also includes an AR block 470 between the reference frame buffer 430 and the motion compensation (MC) block 420. The AR information that was embedded in the encoded bitstream is retrieved by an entropy coding block 440 in the decoder 400 and utilized by the AR block 470 for decoding the bitstream with higher fidelity.

Figure 5:
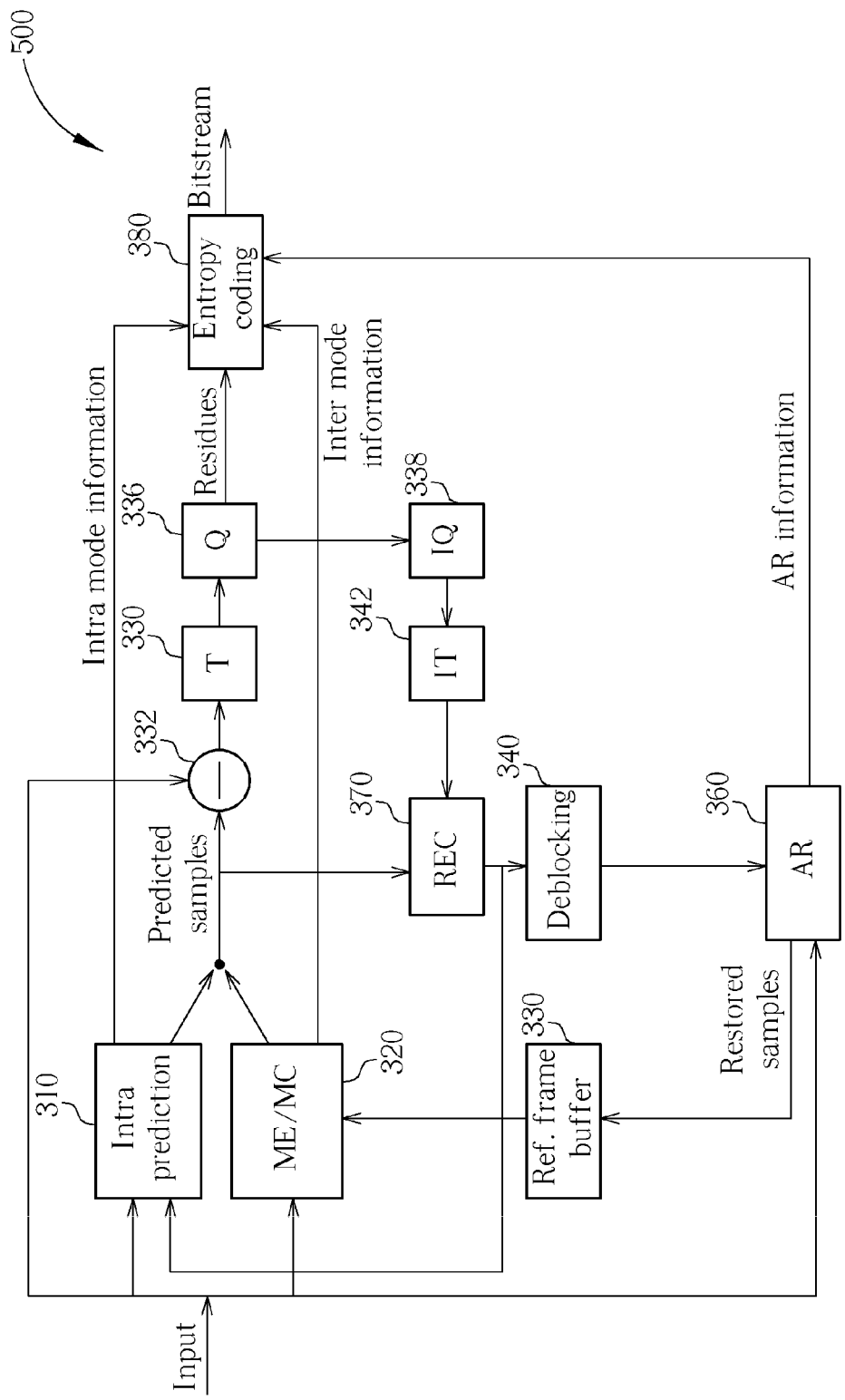
FIG. 5 is a diagram of an encoder according to a second embodiment of the present invention.
Figure 6:
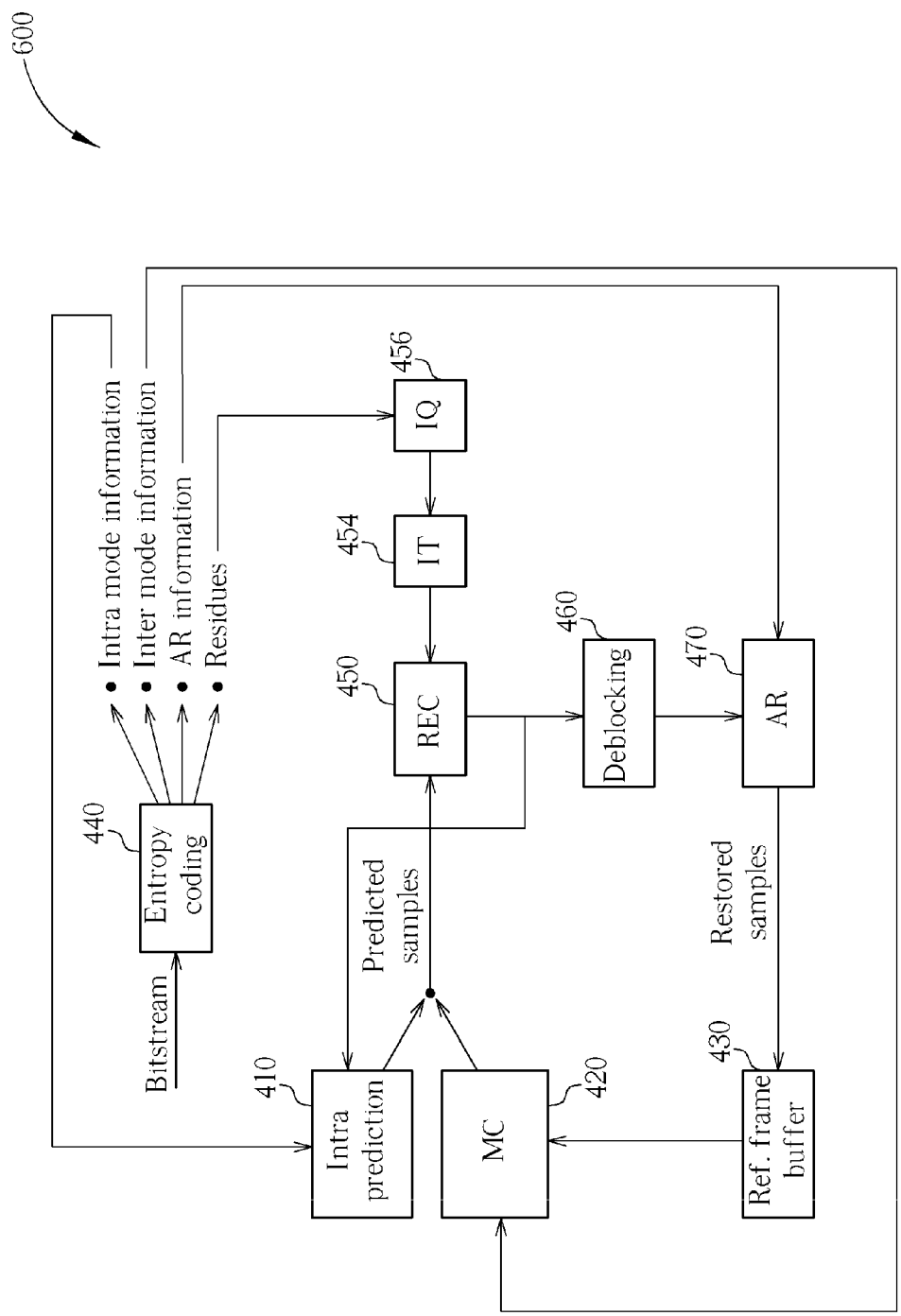
FIG. 6 is a diagram of a decoder according to the second embodiment of the present invention.

Please refer to FIG. 5. FIG. 5 is a diagram of an encoder 500 according to a second embodiment of the present invention. In FIG. 5 the AR block 360 is located after the deblocking filter 340 but before the reference frame buffer 330. It is also possible to merge the deblocking filter 340 and the AR block 360, and in this case deblocking becomes one of the adaptive restoration methods. Similarly, FIG. 6 is a diagram of a decoder 600 according to the second embodiment, where the AR block 470 is in a corresponding position. As can be readily understood by those skilled in the art, the AR block 470 in the decoder should ideally be in a location corresponding to the location of the AR block 360 in the encoder, for ensuring the best possible restoration result. In the second embodiment, the AR block 360 restores processed data of a current frame to reduce the difference between the processed and unprocessed data of the current frame. The processed data of the current frame in this embodiment are processed by the intra prediction block 310 or inter prediction block 320, transform block 334, quantization block 336, inverse quantization block 338, inverse transform block 330, reconstruction block 370, and deblocking filter 340.

Figure 7:
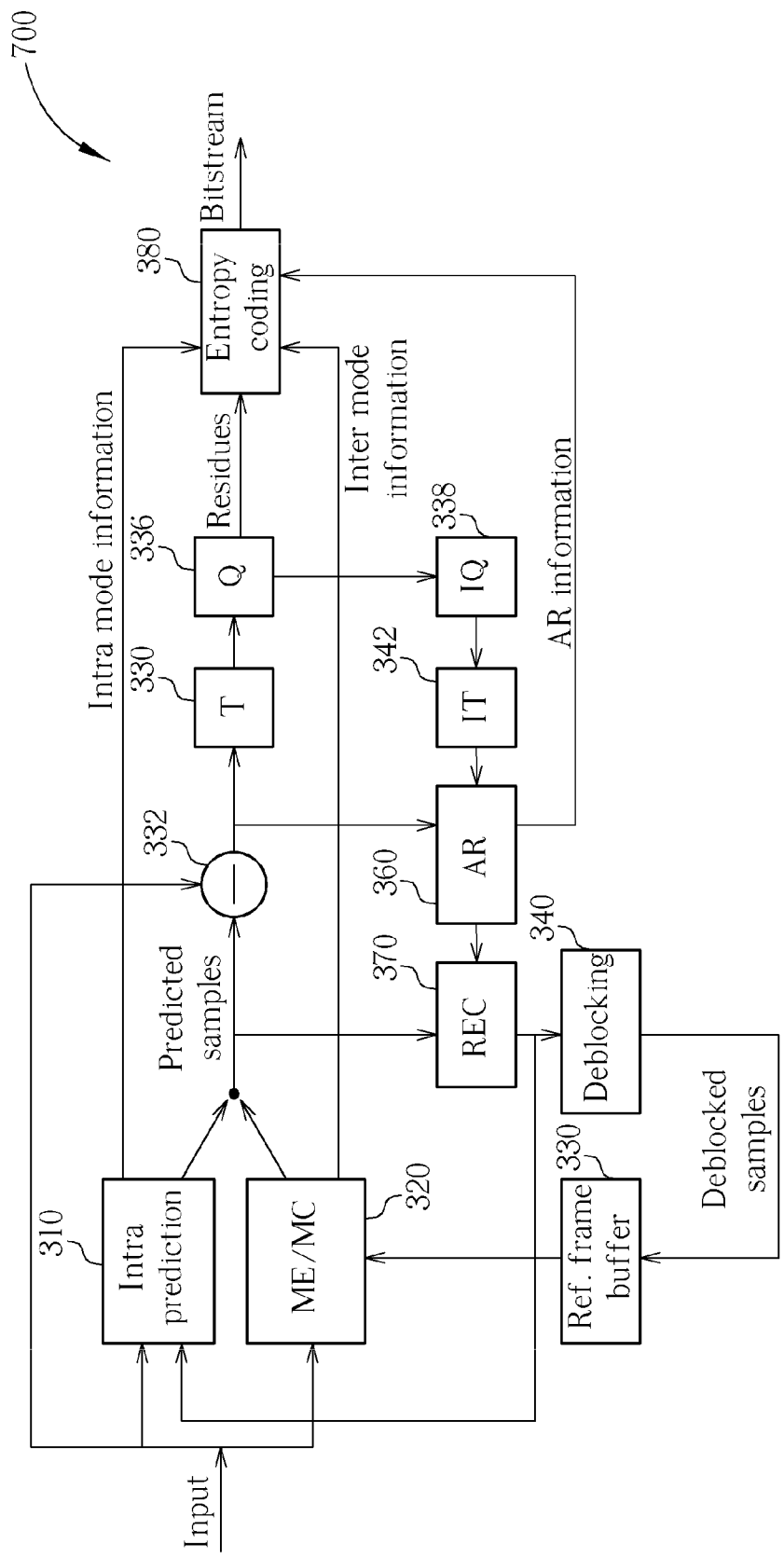
FIG. 7 is a diagram of an encoder according to a third embodiment of the present invention.
Figure 8:
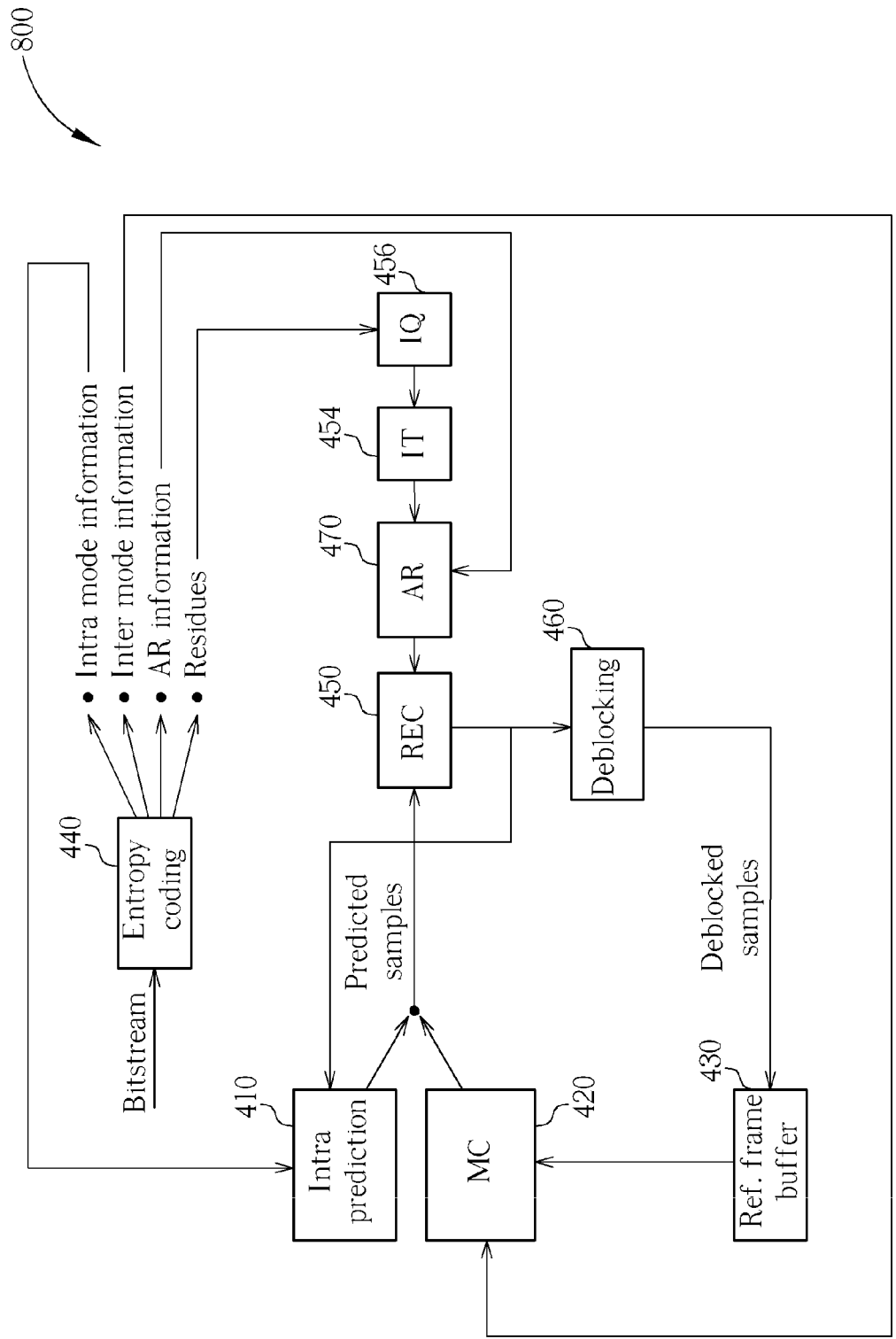
FIG. 8 is a diagram of a decoder according to the third embodiment of the present invention.
Figure 9:
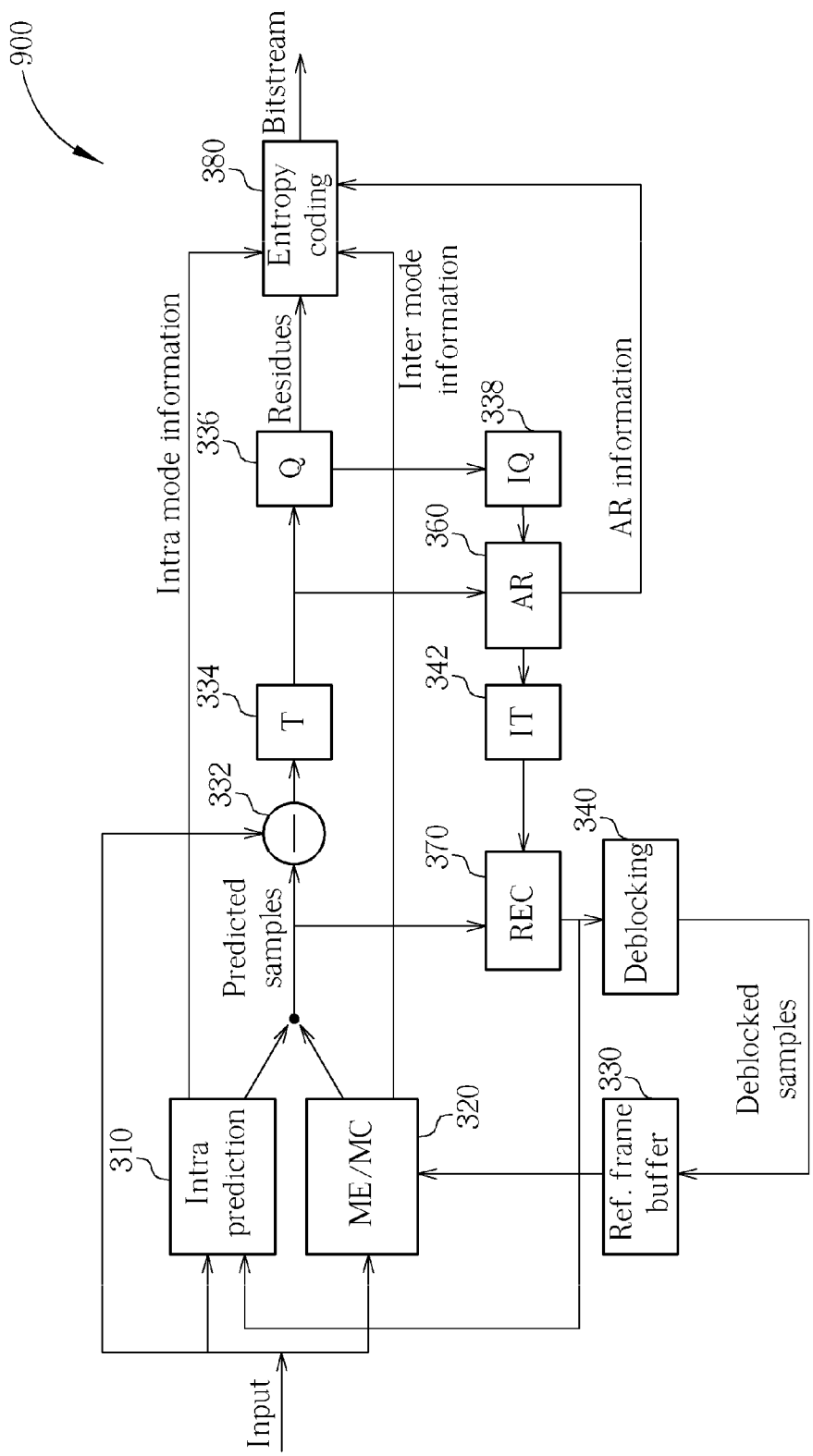
FIG. 9 is a diagram of an encoder according to a fourth embodiment of the present invention.
Figure 10:
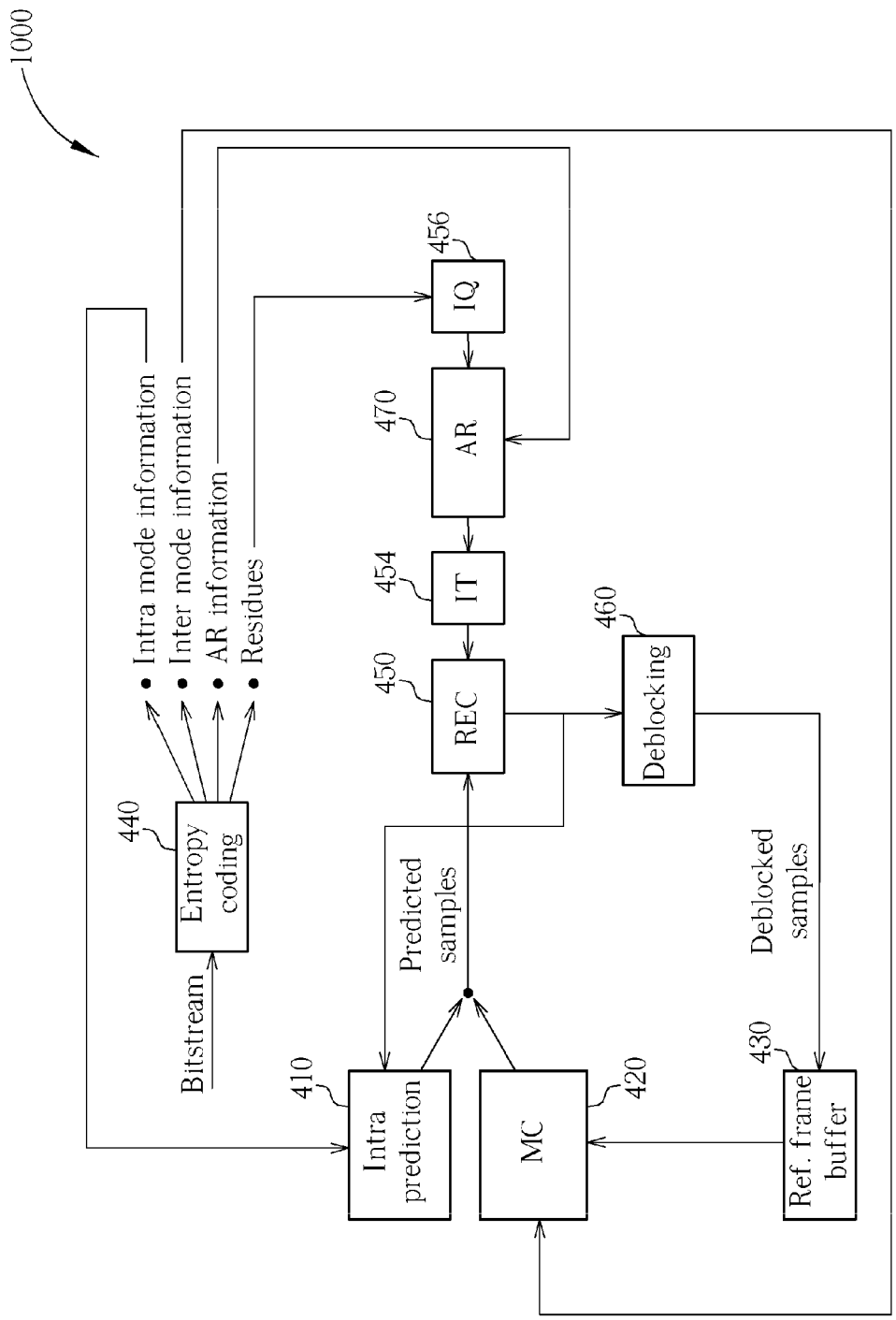
FIG. 10 is a diagram of a decoder according to the fourth embodiment of the present invention.

Please refer to FIGS. 7~10. These figures show different locations of the AR block 360, 470 in an encoder 700, 900 and a decoder 800, 1000, respectively, corresponding to third and fourth embodiments of the present invention. Functional blocks illustrated in FIGS. 7~10 have the same numerals as their equivalent devices in FIGS. 3~6, for simplicity. The AR block 360 in the encoder 700, 900 and the AR block 470 in the decoder 800, 1000 also have, respectively, the same numerals as the first and second embodiments of the present invention. In FIG. 7, the AR block 360 is located between an inverse transform (IT) block 330 and a reconstruction (REC) block 370, for restoring processed data of a current frame being processed by the intra prediction block 310 or inter prediction (ME/MC) block 320, transform block 334, quantization block 336, inverse quantization block 338, and inverse transform block 330. The AR block 360 of the third embodiment reduces the difference between the above described processed data and data output from the subtractor 332. In FIG. 9, the AR block 360 is located between an inverse quantization block 338 and inverse transform block 330, for restoring processed data of a current frame being processed by the intra prediction block 310 or inter prediction (ME/MC) block 320, transform block 334, quantization block 336, and inverse quantization block 338. The AR block 360 of the fourth embodiment reduces the difference between the above described processed data and data output from the transform block 334.

It should also be noted that the disclosed apparatus are not limited to only one adaptive restoration block in an encoder and decoder, respectively. It is possible to have more than one adaptive restoration block positioned at different locations (e.g. shown in the first~fourth embodiments) in an encoder and decoder, respectively, and those skilled in the art should see that a combination of one or more of the disclosed locations of the AR block as shown in FIGS. 3~10 also falls within the scope of the present invention. In some embodiments, each of the adaptive restoration blocks in the encoder performs only one restoration method, and each adaptive restoration block is enabled or disabled according to cost function results or an analysis result. Similar to the encoding method illustrated in FIG. 1, an embodiment of an encoder with multiple AR blocks decides to enable a combination of AR blocks by calculating a cost function for each considered combination of enabling AR blocks and selecting a combination of AR blocks corresponding to a minimum cost function to be enabled. Similar to the encoding method illustrated in FIG. 2, an embodiment of an encoder with multiple AR blocks decides to enable a combination of AR blocks by analyzing video data and determining one or more considered combination of AR blocks. The encoder may analyze current frame or information used during encoding, such as information derived from reference frames, motion vectors, textures, transform results, quantization results, prediction errors, reconstructed errors, or a combination thereof. If there is more than one considered combination, the encoder computes the cost function corresponding to each considered combination and selects a combination of AR blocks with a minimum cost function. If there is only one considered combination, the encoder enables the adaptive restoration blocks that belong to this considered combination.

In some other embodiments, one or more adaptive restoration block in the encoder is capable of performing multiple restoration methods, and thus the encoder enables a combination of adaptive restoration blocks, and selects a final restoration method for each enabled adaptive restoration block.

Since adaptive restoration information including which adaptive restoration block(s) belongs to the selected combination is encoded and embedded in the encoded bitstream, decoders supporting multiple adaptive restoration blocks retrieve the adaptive restoration information from the encoded bitstream, and enable/disable each of the adaptive restoration blocks according to the adaptive restoration information.

The above disclosure provides methods and apparatus for selecting between a plurality of candidate restoration methods or selecting to enable a combination of adaptive restoration blocks according to cost functions and analysis results, in order to code video data at a high fidelity for reducing quantization errors. The coding process covers both spatial and temporal adaptation, and can be applied to all available restoration methods.

By first selecting an optimal restoration method in the encoder utilizing cost function results, and sending information related to said selected restoration method to the decoder, the decoder can perform restoration to ensure maximum reduction of quantization errors in a decoded bitstream.

Those skilled in the art will readily observe that numerous modifications and alterations of the device and method may be made while retaining the teachings of the invention.

What is claimed is:

1. A coding system comprising:
   an inter prediction block, for performing prediction on macroblocks of a current frame and generating prediction information according to restored reconstructed samples of a reference frame;
   a transform and quantization block, coupled to the inter prediction block, for performing transform and quantization processes on prediction residues;
   a reconstruction loop, coupled between the transform and quantization block and the inter prediction block, for reconstructing the current frame according to outputs of the transform and quantization block and the inter prediction block to generate the restored reconstructed samples, the reconstruction loop comprising:

an adaptive restoration block, for performing restoration on processed data by systematically testing a plurality of different candidate restoration methods from a list of restoration methods, selecting at least one of the tested candidate restoration methods as a final restoration method, and generating adaptive restoration information corresponding to the final restoration method; and an encoding unit, coupled to the transform and quantization block and adaptive restoration block, for encoding the prediction information and adaptive restoration information to generate an encoded bitstream.

2. The coding system of claim 1, wherein the reconstruction loop further comprises:
a deblocking unit, performing deblocking to generate the processed data; and
a reference frame buffer, coupled to the deblocking unit, for storing the processed data;
wherein the adaptive restoration block is coupled between the reference frame buffer and the inter prediction block, for generating the adaptive restoration information and the restored reconstructed samples according to the processed data retrieved from the reference frame buffer and the current frame.

3. The coding system of claim 1, wherein the reconstruction loop further comprises:
a deblocking unit, performing deblocking to generate the processed data; and
a reference frame buffer, coupled to the adaptive restoration block and the inter prediction block, for storing the restored reconstructed samples output from the adaptive restoration block;
wherein the adaptive restoration block is coupled between the deblocking unit and the reference frame buffer, for generating the adaptive restoration information and the restored constructed samples according to the processed data and the current frame.

4. The coding system of claim 1, wherein the reconstruction loop further comprises:
an inverse transform and quantization block, coupled to the transform and quantization block and the adaptive restoration block, for performing inverse transform and quantization processes on an output of the transform and quantization block to generate the processed data; and
a reconstruction circuit coupled to the adaptive restoration block, for reconstructing the current frame according to an output of the adaptive restoration block;
wherein the adaptive restoration block is coupled between the inverse transform and quantization block and the reconstruction circuit, for generating the adaptive restoration information according to the prediction residues and an output of the inverse transform and quantization block.

5. The coding system of claim 1, wherein the reconstruction loop further comprises:
an inverse quantization block, coupled to the transform and quantization block, for performing an inverse quantization process on an output of the transform and quantization block to generate the processed data; and
an inverse transform block, coupled to the adaptive restoration block, for performing an inverse transform process;
wherein the adaptive restoration block is coupled between the inverse quantization block and inverse transform block, for generating the adaptive restoration information according to information before quantization and an output of the inverse quantization block.

6. The coding system of claim 1, wherein the reconstruction loop further comprises a second adaptive restoration block positioned at a different location for performing restoration.

7. The coding system of claim 6, wherein each of the adaptive restoration blocks is enabled or disabled by comparing cost function results of all considered combinations of adaptive restoration blocks.

8. The coding system of claim 6, wherein each of the adaptive restoration blocks is enabled or disabled by analyzing the current frame or information used during encoding.

9. The coding system of claim 1, wherein the adaptive restoration block selects the final restoration method by comparing cost function results of each candidate restoration method.

10. The coding system of claim 1, wherein the adaptive restoration block selects at least one of the plurality of different candidate restoration methods by analyzing the current frame or information used during encoding.

11. A method of coding a current frame utilizing adaptive restoration, the method comprising:
receiving a current frame;
performing prediction to generate prediction residues;
processing the prediction residues with at least a quantization process;
performing at least one candidate restoration method on processed data by systematically testing a plurality of different candidate restoration methods from a list of restoration methods;
selecting at least one of the tested candidate restoration methods as a final restoration method; and
encoding the current frame according to the selected final restoration method.

12. The method of claim 11, wherein the step of selecting one of the candidate restoration methods comprises:
determining a minimum cost function result; and
selecting the candidate restoration method corresponding to the minimum cost function result as the final restoration method.

13. The coding system of claim 11, wherein the step of selecting one of the candidate restoration methods comprises selecting the final restoration method by analyzing the current frame or information used during encoding.

14. The method of claim 11, further comprising:
generating adaptive restoration information corresponding to the final restoration method;
encoding the adaptive restoration information; and
embedding the encoded restoration information into the encoded bitstream.

15. The method of claim 11, wherein the processed data are deblocked samples after reconstruction of a reference frame.

16. The method of claim 11, wherein the processed data are deblocked samples after reconstruction of the current frame.

17. The method of claim 11, further comprising:
processing the prediction residues with transform, quantization, inverse transform, and inverse quantization processes to generate the processed data.

18. The method of claim 11, further comprising:
processing the prediction residues with transform, quantization, and inverse transform processes to generate the processed data.

19. A coding system comprising:
a decoding block, for receiving and decoding an encoded bitstream to derive residues, prediction information, and adaptive restoration information; and a reconstruction loop, coupled to the decoding block, for reconstructing a current frame according to the residues and prediction information, wherein the reconstruction loop comprises:
an adaptive restoration block, capable of performing multiple restoration methods, wherein the adaptive restoration block performs restoration on processed data by selecting at least one of the restoration methods according to the adaptive restoration information.

20. The coding system of claim 19, wherein the reconstruction loop further comprises:
a deblocking unit, for performing deblocking to generate the processed data; and
a reference frame buffer, coupled to the deblocking unit, for storing the processed data;
wherein the adaptive restoration block is coupled to the reference frame buffer for retrieving the processed data to perform restoration.

21. The coding system of claim 19, wherein the reconstruction loop further comprises:
a deblocking unit, for performing deblocking to generate the processed data; and
a reference frame buffer, coupled to the adaptive restoration block, for storing restored reconstructed samples output from the adaptive restoration block;
wherein the adaptive restoration block is coupled between the deblocking unit and the reference frame buffer, for generating the restored constructed samples according to the adaptive restoration information.

22. The coding system of claim 19, wherein the reconstruction loop further comprises:
an inverse transform and quantization block, for performing inverse transform and quantization processes to generate the processed data; and
a reconstruction circuit coupled to the adaptive restoration block, for reconstructing the current frame according to an output of the adaptive restoration block;
wherein the adaptive restoration block is coupled between the inverse transform and quantization block and the reconstruction circuit.

23. The coding system of claim 19, wherein the reconstruction loop further comprises:
an inverse quantization block, for performing an inverse quantization process to generate the processed data; and
an inverse transform block, coupled to the adaptive restoration block for performing an transform process;
wherein the adaptive restoration block is coupled between the inverse quantization block and inverse transform block.

24. The coding system of claim 19, wherein the reconstruction loop further comprises a second adaptive restoration block positioned at a different location in the reconstruction loop for performing restoration.

25. The coding system of claim 24, wherein both the first adaptive restoration block and the second adaptive restoration block are individually enabled or disabled according to the adaptive restoration information.

26. A coding method comprising:
receiving and decoding an encoded bitstream to derive residues, prediction information, and adaptive restoration information;
reconstructing a current frame according to the residues and prediction information by at least a quantization process;
selecting at least one of multiple restoration methods according to the adaptive restoration information to perform restoration on processed data.

27. The method of claim 26, wherein the processed data are deblocked samples after reconstruction of a reference frame.

28. The method of claim 26, wherein the processed data are deblocked samples after reconstruction of the current frame.

29. The method of claim 26, further comprising:
processing the residues with inverse quantization and inverse transform processes to generate the processed data.

30. The method of claim 26, further comprising:
processing the residues with inverse quantization to generate the processed data.

31. A coding system comprising:
an inter prediction block, for performing prediction on macroblocks of a current frame and generating prediction information according to restored reconstructed samples of a reference frame;
a transform and quantization block, coupled to the inter prediction block, for performing transform and quantization processes on prediction residues;
a reconstruction loop, coupled between the transform and quantization block and the prediction block, for reconstructing the current frame according to outputs of the transform and quantization block and the inter prediction block to generate the restored reconstructed samples, the reconstruction loop comprising:
a first adaptive restoration block, for performing restoration on a first set of processed data; and
a second adaptive restoration block, for performing restoration on a second set of processed data;
wherein the first and second adaptive restoration blocks are positioned at different locations and generate adaptive restoration information; and
an encoding unit, coupled to the transform and quantization block and the first and second adaptive restoration blocks, for encoding the prediction information and adaptive restoration information to generate an encoded bitstream.

32. The coding system of claim 31, wherein the reconstruction loop further comprises:
a deblocking unit, for performing deblocking to generate the first set of processed data; and
a reference frame buffer, coupled to the deblocking unit, for storing the first set of processed data for the first adaptive restoration.

33. The coding system of claim 31, wherein the reconstruction loop further comprises:
a deblocking unit, for performing deblocking to generate the first set of processed data; and
a reference frame buffer, coupled to the first adaptive restoration block and the inter prediction block, for storing the restored reconstructed samples output from the first adaptive restoration block.

34. The coding system of claim 31, wherein the reconstruction loop further comprises:
an inverse transform and quantization block, coupled to the transform and quantization block and the first adaptive restoration block, for performing inverse transform and quantization processes on an output of the transform and quantization block to generate the first set of processed data; and
a reconstruction circuit coupled to the first adaptive restoration block, for reconstructing the current frame according to an output of the first adaptive restoration block.

35. The coding system of claim 31, wherein the reconstruction loop further comprises:
- an inverse quantization block, coupled to the transform and quantization block, for performing an inverse quantization process on an output of the transform and quantization block to generate the processed data; and
- an inverse transform block, coupled to the first adaptive restoration block, for performing an inverse transform process on an output of the first adaptive restoration block.

36. The coding system of claim 31, wherein each of the first and second adaptive restoration blocks is enabled or disabled by comparing cost function results of enabling all considered combinations of adaptive restoration blocks.

37. The coding system of claim 31, wherein both the first adaptive restoration block and the second adaptive restoration block are individually enabled or disabled by analyzing the current frame or information used during encoding.

38. A coding system comprising:
- a decoding block, for receiving and decoding an encoded bitstream to derive residues, prediction information, and adaptive restoration information; and
- a reconstruction loop, coupled to the decoding block, for reconstructing a current frame according to the residues and prediction information, wherein the reconstruction loop comprises:
  - a first adaptive restoration block, performing restoration on a first set of processed data according to the adaptive restoration information; and
  - a second adaptive restoration block, performing restoration on a second set of processed data according to the adaptive restoration information;
  - wherein the first adaptive restoration block and the second adaptive restoration block are positioned at different locations.

39. The coding system of claim 38, wherein the reconstruction loop further comprises:
- a deblocking unit, for performing deblocking to generate the first set of processed data; and
- a reference frame buffer, coupled to the deblocking unit, for storing the first set of processed data;
- wherein the first adaptive restoration block is coupled to the reference frame buffer for retrieving the first set of processed data to perform restoration.

40. The coding system of claim 38, wherein the reconstruction loop further comprises:
- a deblocking unit, for performing deblocking to generate the first set of processed data; and
- a reference frame buffer, coupled to the adaptive restoration block, for storing restored reconstructed samples output from the first adaptive restoration block;
- wherein the first adaptive restoration block is coupled between the deblocking unit and the reference frame buffer, for generating the restored constructed samples according to the adaptive restoration information.

41. The coding system of claim 38, wherein the reconstruction loop further comprises:
- an inverse transform and quantization block, for performing inverse transform and quantization processes to generate the first set of processed data; and
- a reconstruction circuit coupled to the first adaptive restoration block, for reconstructing the current frame according to an output of the first adaptive restoration block.

42. The coding system of claim 38, wherein the reconstruction loop further comprises:
- an inverse quantization block, for performing an inverse quantization process to generate the first set of processed data; and
- an inverse transform block, coupled to the first adaptive restoration block for performing a transform process.

43. The coding system of claim 38, wherein both the first adaptive restoration block and the second adaptive restoration block are individually enabled or disabled according to the adaptive restoration information.

* * * * *